Sept. 25, 1928.
R. J. WEIGLE
DIRECTION INDICATOR FOR VEHICLES
Filed Dec. 19, 1927
1,685,257
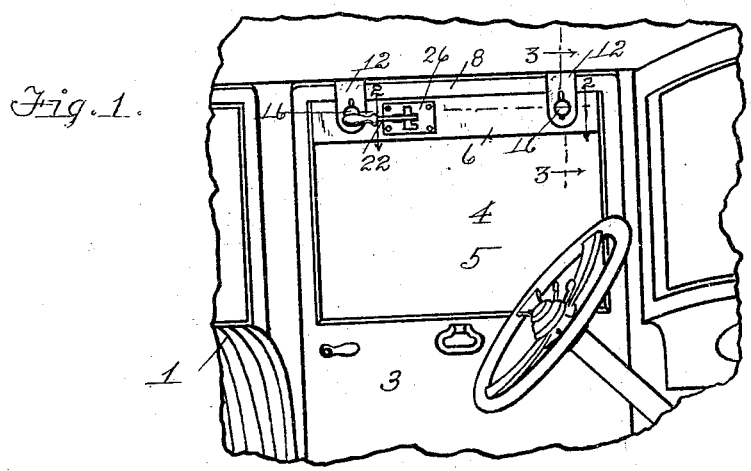
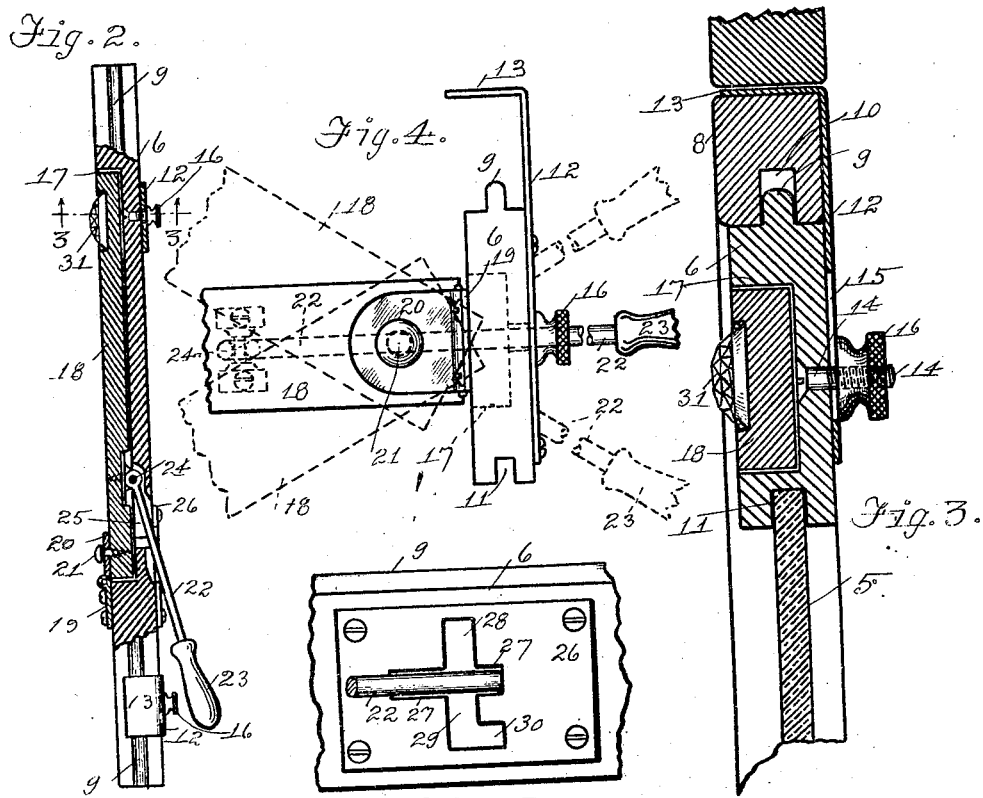
INVENTOR
Russell J. Weigle
BY
Cyrus W. Rice
ATTORNEY Patented Sept. 25, 1928.

1,685,257

UNITED STATES PATENT OFFICE.

RUSSELL J. WEIGLE, OF EAST GRAND RAPIDS, MICHIGAN.

DIRECTION INDICATOR FOR VEHICLES.

Application filed December 19, 1927. Serial No. 240,997.

The present invention relates to direction indicators for vehicles, as automobiles and the like; and its object is, generally, to provide a device of that character improved in respects hereinafter appearing; and more particularly, to provide in such a device an indicating arm swingable horizontally and vertically into and out of indicating positions, and improved means for thus swinging said arm to such positions and releasably holding the same therein; and further, to provide such a device which may be readily mounted and dismounted; and further, to provide such a device having such an indicating arm held from all outward extension when not in operation.

This and any other and more specific objects hereinafter appearing are attained by, and the invention finds preferable embodiment in, the structure hereinafter particularly described in the body of this specification and illustrated by the accompanying drawings, in which:—

Figure 1 is a view in perspective of a portion of the interior of a closed automobile, showing my direction indicator applied thereto and in its inoperative position;

Figure 2 is a top plan view of the direction indicator, its middle portion being sectioned horizontally on line 2—2 of Figure 1;

Figure 3 is a vertical sectional view of the same and of parts of the automobile taken on line 3—3 of Figures 1 and 2;

Figure 4 is a rear end view of said indicator, certain parts being broken away; and Figure 5 is an inner side view of a portion of said indicator illustrating the guide slots therein.

In the embodiment of the invention illustrated by said drawings, my direction indicator is shown applied to or mounted on an automobile 1 of the closed type having a swingable door closure 3 provided with a window 4 having a glass sash 5 slidable vertically to closed and open positions. The direction indicator has a body 6 adapted to be removably held between the upper end of said window (i. e. the under side of said window's upper cross bar 8) and the upper end of said sash, said body 6 having desirably a rib 9 received into the groove 10 of said cross bar and having also a groove 11 into which the upper edge of the sash is received. Additional supporting means for the indicator are desirably provided as shown, such means being sheet metal supports 12 provided with horizontal outward extensions 13 adapted to rest on the upper end of the closed closure, such supports being secured in vertical adjustment by threaded posts 14 carried by the body 6, extending through vertical slots 15 and provided with wing nuts 16—all as particularly well seen in Figure 3.

This body 6 is provided with a cavity 17 in its outer side snugly receiving an indicating arm 18 in its inoperative position, so that no portion of said arm in its said position extends outwardly from the outer surface or face of said body.

This indicator arm 18 is mounted at its rear end on said body 6 to swing horizontally and also vertically into and out of direction-indicating or stop-indicating positions, being desirably so mounted by the following means:

A hinge member is shown comprising leaves 19, 20 swingably connected on a vertical axis, the leaf 19 being carried by the body 6 and the rear end of the indicator arm 18 being carried by the other leaf 20 swingably on a horizontal axis, the screw 21.

For operating this indicator arm, a lever 22 is provided having at its inner end the handle portion 23 inside the automobile and being connected to the inner side of the arm 18 pivotally on a vertical axis 24. This operating lever extends through an opening 25 in the body 6, the inner surface of said body having a plate 26 secured thereto. This plate has a guide slot for the lever 22 which extends therethrough, such slot having a main horizontal portion 27 and a vertical portion extending transversely to, and both above at 28 and below at 29, said horizontal portion, the lower part 29 of such vertical slot being provided with a horizontal forward extension 30. It will be seen that the lever 22 in its operating movement slides along in this slot and its said portions, fulcruming slidably on the edges of the slot to swing the arm 18 to desired indicating positions, and resting against portions of said edges to hold the arm in such positions; and it will be seen that the indicator arm 18 cannot be swung to inoperative position within the cavity 17 unless the lever 22 is in the horizontal portion 27 of the slot.

A prism or reflector 31, or an electric light, may be carried adjacent the outer end of the indicator arm.

The invention being intended to be pointed out in the claims, is not to be limited to or by details of construction of the particular embodiment thereof illustrated by the drawings or hereinbefore described.

I claim:

1. In a device of the character described: a body having a guide slot comprising a horizontal portion and a vertical portion; a hinge member comprising leaves swingably connected on a vertical axis one of said leaves being carried by the body; an indicator arm carried by the other leaf of the hinge member swingably on a horizontal axis; an operating elongated member connected to the arm pivotally on a vertical axis and movable in said portions of the guide slot.

2. In a device of the character described: a body having a guide slot comprising a horizontal portion and a vertical portion having a horizontal extension; a hinge member comprising leaves swingably connected on a vertical axis one of said leaves being carried by the body; an indicator arm carried by the other leaf of the hinge member swingably on a horizontal axis; an operating elongated member connected to the arm pivotally on a vertical axis and movable in said portions of the guide slot.

3. In a device of the character described: a body having a guide slot comprising a horizontal portion and a vertical portion; a hinge member comprising leaves swingably connected on a vertical axis one of said leaves being carried by the body; an indicator arm carried by the other leaf of the hinge member swingably on a horizontal axis; an operating elongated member connected to the arm pivotally on a vertical axis and movable in said portions of the guide slot and slidably fulcruming on the edges thereof.

4. In combination with a vehicle having a window and a vertically movable sash therein, a device of the character described comprising: a horizontally disposed body adapted to be holdingly engaged by and between the adjacent ends of the window and sash and having in its under side a recess adapted to receive the upper edge of the sash; an indicator arm carried by the body swingably to outward operative position and to inward retracted position; means connected to the arm and extending into the vehicle for swinging the arm to said positions.

5. In combination with a vehicle having a swingably mounted door closure provided with a window and a vertically movable sash therein, a device of the character described comprising: a horizontally disposed body adapted to be holdingly received between the adjacent ends of the window and sash and having a vertically adjustable support provided with a horizontal extension adapted to rest on the upper end of the closure; an indicator arm carried by the body swingably to outward operative position and to inward retracted position; means connected to the arm and extending into the vehicle for swinging the arm to said positions.

6. In a device of the character described: a body; an indicator arm mounted thereon swingably in horizontal and vertical planes; an elongated operating member connected to the arm and having a guided longitudinal movement and a swinging movement horizontally and vertically on the body.

In testimony whereof I have hereunto set my hand at Grand Rapids, Michigan, this 15th day of December, 1927.

RUSSELL J. WEIGLE.